United States Patent [19]
Thyen

[11] Patent Number: 6,019,311
[45] Date of Patent: Feb. 1, 2000

[54] AIRSHIP WITH SAILS

[76] Inventor: Christopher D. Thyen, 2323 Snowshoe La., Maplewood, Minn. 55119

[21] Appl. No.: 09/024,460

[22] Filed: Feb. 17, 1998

[51] Int. Cl.⁷ ........................................................ B64B 1/02
[52] U.S. Cl. ............................................................. 244/30
[58] Field of Search .................................. 244/2, 24, 29, 244/30, 125, 128, 62

[56] References Cited

U.S. PATENT DOCUMENTS

| | | | |
|---|---|---|---|
| 701,510 | 6/1902 | Samorski | 244/30 |
| 817,442 | 4/1906 | Page | 244/128 |
| 827,157 | 7/1906 | Kramer. | |
| 922,549 | 5/1909 | Wheeler. | |
| 1,023,404 | 4/1912 | Wymore. | |
| 1,045,337 | 11/1912 | Spilka. | |
| 1,061,484 | 5/1913 | Lowe. | |
| 1,120,981 | 12/1914 | Schroder | 244/29 |
| 1,656,780 | 1/1928 | Diago | 244/24 |

Primary Examiner—Peter M. Poon
Assistant Examiner—Charles Ducker, Jr.
Attorney, Agent, or Firm—James W. Miller

[57] ABSTRACT

An airship includes a relatively rigid framework that is meant to resemble a sailing ship having an inclined bow, a rounded bottom, a vertical stern, vertical sides and a flat upper deck. A plurality of lifting bladders carrying helium or the like are enclosed within the framework to make it lighter than air. Front and rear masts extend upwardly from the deck and carry front and rear sails on pivotal booms. A passenger and crew compartment is located on the deck behind the front and rear masts. The masts are pivotally supported on the framework to pivot laterally to one side or the other in the y-z plane to open up a gap there-between if so desired. A spinnaker or jib can be set forwardly of the masts in this gap to be fully exposed to wind from above the framework. Thus, the use of the sails for primary or supplementary propulsion of the framework is enhanced, and the deck enables passengers or crew to leave the compartment and be supported and carried by the deck.

19 Claims, 8 Drawing Sheets

AIRSHIP WITH SAILS

TECHNICAL FIELD

This invention relates to an airship having sails for primary or supplementary propulsion and to an airship having an upper deck located above the lifting bladders.

BACKGROUND OF THE INVENTION

Airships are lighter than air flying vehicles which are also called dirigibles. Modern airships have a rigid framework which carry lifting bladders that are filled with a lighter than air substance, such as helium. The use of sufficient helium will make the entire structure "lighter than air" allowing it to rise into the air. The amount of rise and or descent is controllable through various systems that are well known in the art.

Modern airships include a passenger and crew gondola attached to the underside of the airship. This gondola is typically small and has limited capacity for carrying passengers. Propulsion is provided by one or more engines or motors powering fans or propellers. Accordingly, fuel for such engines or motors must be carried on the airship, further limiting its ability to carry passengers and/or cargo.

The passenger gondolas used on airships today are enclosed compartments in which the passengers and crew are carried. Because the gondola is carried beneath the airship, there is no exposed deck, akin to the deck of a sailing ship, on which the passengers might be carried. Thus, traveling in a modern airship is a somewhat confining experience. The sense of freedom one receives on the deck of a sailing ship, or from the unenclosed confines of a basket of a hot air balloon, are missing from the gondolas used on airships.

Airships are designed to operate in portions of the lower atmosphere where significant winds are often present. Yet, modern airships do not attempt to use such winds for propulsion. In fact, the elongated, oval shape of most modern airships preclude any effective use of the wind for propulsion. Accordingly, propulsion is exclusively provided by the engines or motors carried on the airship.

Various patents directed to airships have suggested using wind catching sails for helping to propel the airship. See U.S. Pat. No. 827,157 to Kramer, U.S. Pat. No. 922,549 to Wheeler, U.S. Pat. No. 1,023,404 to Wymore, U.S. Pat. No. 1,045,337 to Spilka and U.S. Pat. No. 1,061,484 to Lowe. However, in such patents, the sails are generally beneath the lifting bladders or gas envelope of the airship, limiting sail size and thus effectiveness. In Spilka, the sail is shown above the lifting bladders but far removed from the passenger and crew carrying structure of the airship. Thus, it would be difficult to deploy the sail and adjust its orientation relative to the prevailing winds.

Moreover, all of the sails shown in the above noted patents teach a fixed sail carrying mast like that used on boats or sailing ships. In other words, the mast is fixed during use to the framework of the airship with the bottom of the sail pivoting around the mast on a pivotal, substantially horizontal boom. The sail is locked in place by cinching or securing the boom in place. However, this structure does not maximize the sail area and limits the adjustability of the sails relative to the prevailing winds.

SUMMARY OF THE INVENTION

One aspect of this invention is to provide an airship having a configuration much like that of a sailing ship. This aspect of this invention is provided in an airship which includes a rigid framework. A means is attached to the framework for containing a lighter than air substance to thereby lift the framework. A substantially flat deck is carried on the framework above the at least one bladder. Passengers or crew can be supported on this deck.

Another aspect of this invention is to provide an airship having a unique sail arrangement which provides propulsion far more effectively than any previously known in airships and which is far easier to deploy and control. This aspect of this invention is provided in an airship which includes a rigid framework having a longitudinal x axis, a vertical y axis, and a transverse z axis. A means is attached to the framework for containing a lighter than air substance to thereby lift the framework. At least one vertically extending mast is carried on the framework for carrying a wind catching sail that may be unfurled for catching wind. The mast is pivotally carried on the framework to be capable of transversely pivoting on the framework in the plane defined by the y and z axes.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 4:
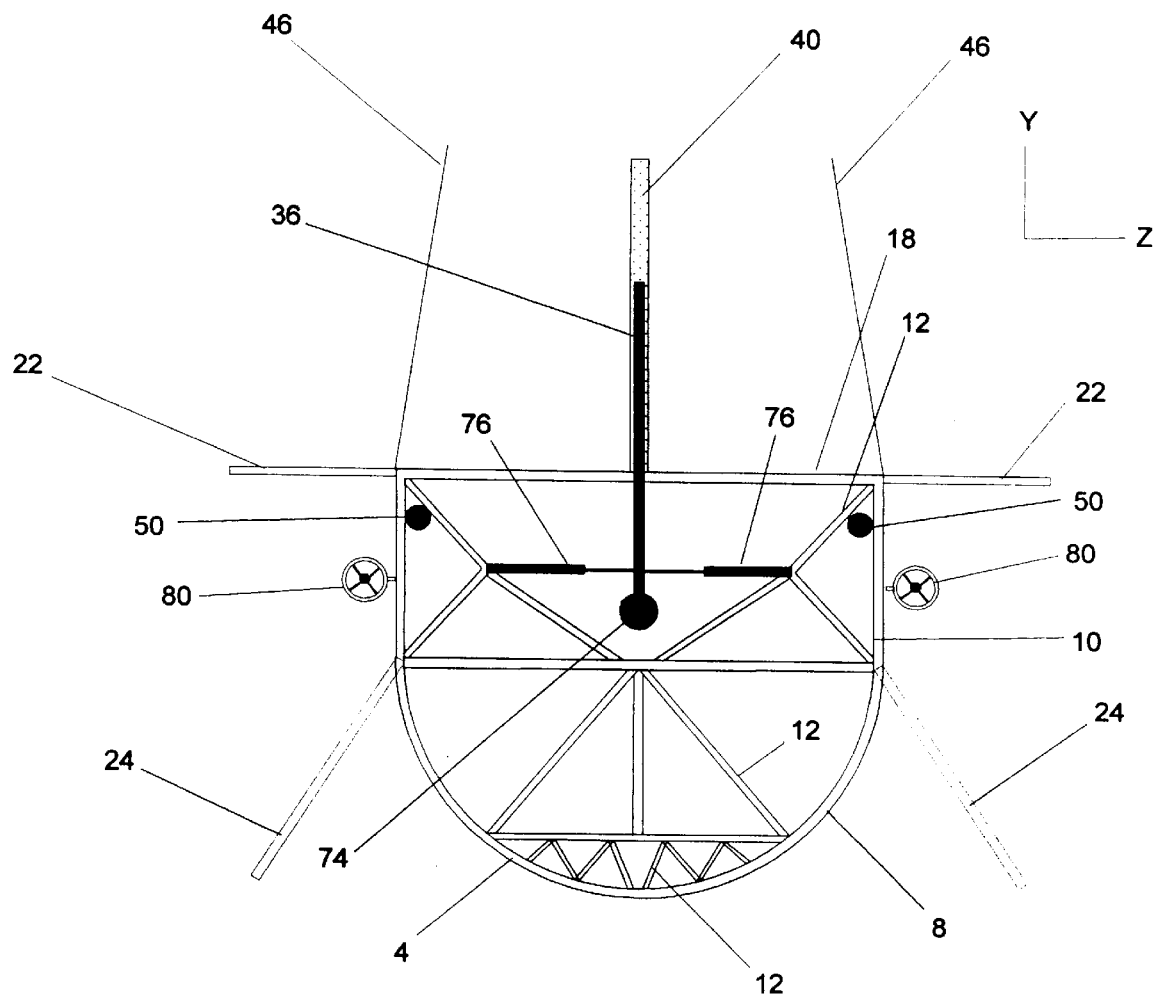
FIG. 4 is a rear view similar to FIG. 3 but showing only a portion of the airship with one of the masts in an upright orientation relative to a lateral y-z plane.
Figure 5:
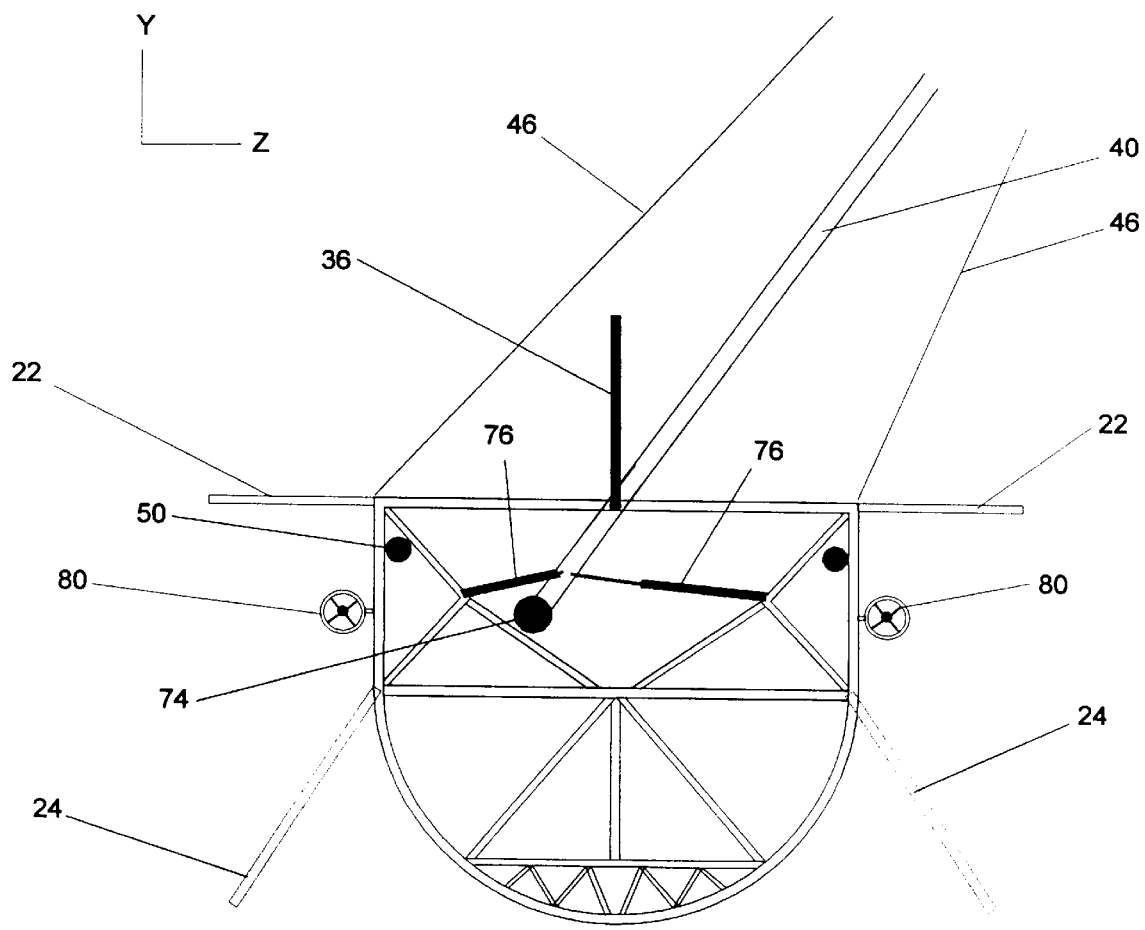
FIG. 5 is a view similar to FIG. 4 but showing one of the masts in a tilted orientation relative to the lateral y-z plane.

This invention comprises an improved airship generally indicated as 2. Airship 2 has a rigid framework 4 made from a plurality of spaced transverse frames 6 which are spaced apart relative to one another along the length of airship 2. Transverse frames 6 are shaped to have a semi-circular lower half 8 and a rectangular upper half 10 as shown in FIGS. 4 and 5. Frames 6 can include any desired configuration of strengthening trusses or cross-members 12.

Figure 6:
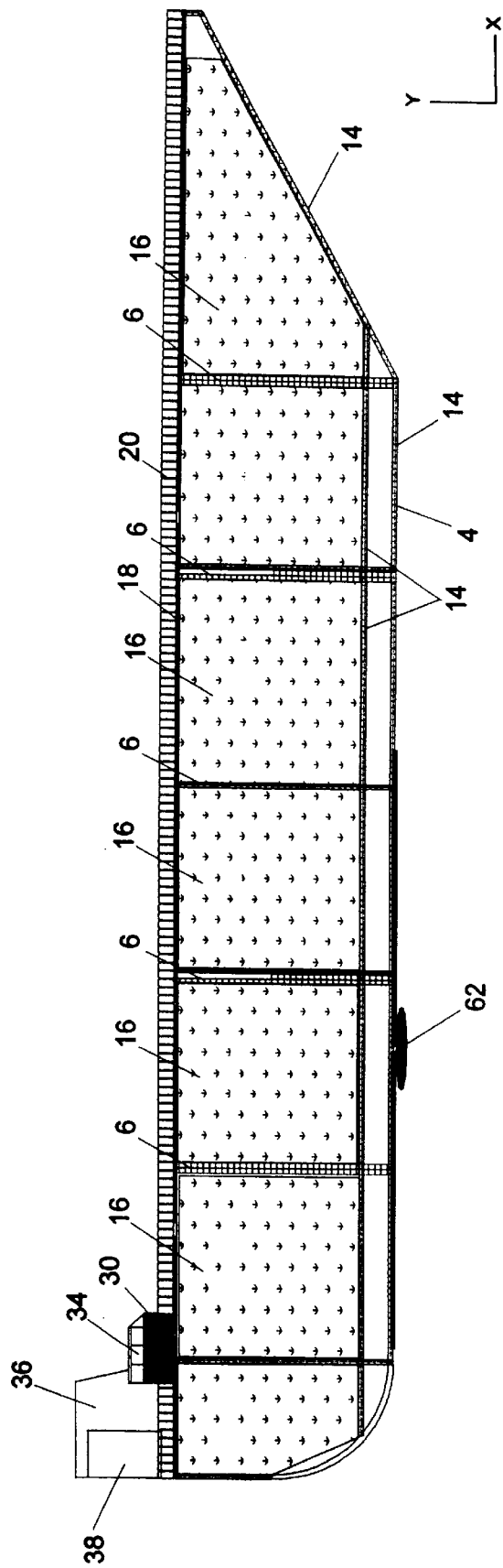
FIG. 6 is a longitudinal cross-sectional view of a portion of the airship of FIG. 1, particularly illustrating the framework and lifting bladder structure of the airship with a keel in a raised, stowed position.
Figure 7:
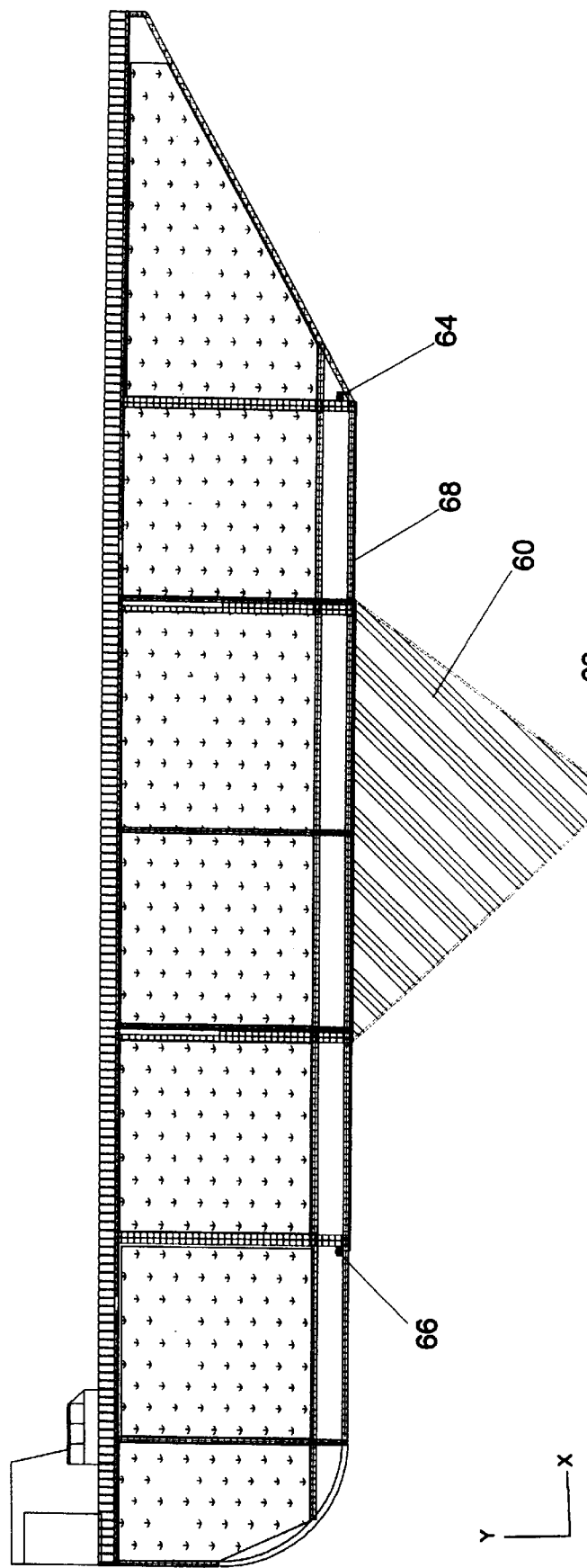
FIG. 7 is a longitudinal, cross-sectional view similar to FIG. 6 but showing the keel in a lowered, deployed position.

The spaced transverse frames 6 are united or tied together by longitudinal stringers or girders 14. Referring to FIGS. 6 and 7, some of the longitudinal girders 14 are shown, but many more girders 14 that are not specifically shown may be used to connect transverse frames 6 as dictated by the requirement for structural stability and strength. The use of such transverse frames 6 and longitudinal girders 14 in the construction of airships is well known and need not be further described herein.

A plurality of flexible gas cells or lifting bladders 16 are supported within framework 4 in the volumes provided between transverse frames 6. As shown in FIGS. 6 and 7, seven such lifting bladders 16 are provided. These lifting bladders 16 will contain a lifting substance, such as helium, which provides the lift required to make airship 2 lighter than air. Again, the use of such lifting bladders 16 is well known in the airship art and need not be further described.

Framework 4 includes a substantially flat horizontal deck 18 carried on the tops of transverse frames 6 and the upper longitudinal girders 14 extending between frames 6. Deck 18 is designed to be substantially continuous over the entire extent of airship 2 from the front to the back and from one side to the other, though a smaller, partial deck 18 could be used instead. A peripheral side rail 20 extends around the peripheral exterior edges of deck 18 to help prevent passengers or crew who might be on deck 18 from falling off. The front longitudinal stringers 14 used on airship 2 can be slanted downwardly to provide a configuration which resembles the bow of a sailing ship. Similarly, framework 4 at the rear of airship 2 extends vertically and is shaped to resemble the stern of a sailing ship.

Framework 4 can be covered with any suitable fabric type outer covering. When this is done, the overall airship 2 has a shape that closely resembles that of a sailing ship, i.e. a body with a slanted bow, a generally vertical stern, a rounded bottom formed by the lower semi-circular half 8 of transverse frames 6, generally vertical sides formed by the rectangular upper half 10 of transverse frames 6, all of which carries flat upper deck 18. All of the lifting bladders 16 are enclosed and carried within this structure so that the upper deck 18 is free and unencumbered. As such, this structure is unique in the airship art. Airship 2 is provided with front, left and right canard wings 22. Each canard wing 22 sticks out from one side of airship 2. Each canard wing 22 is horizontal and is positioned at approximately the level of deck 18. See FIGS. 2, 4 and 5 for a depiction of canard wings 22.

Figure 1:
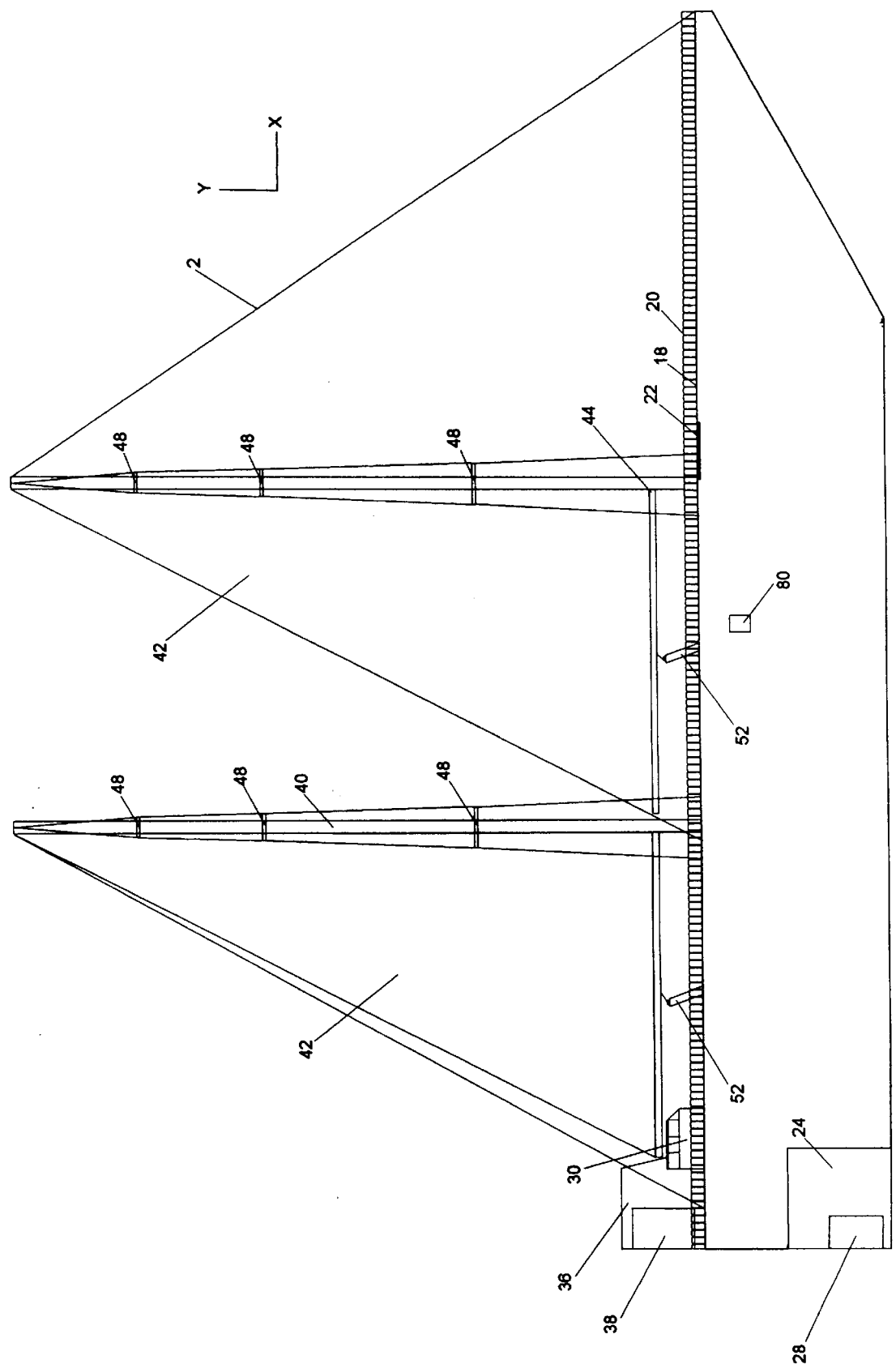
FIG. 1 is a side elevational view of an improved airship according to this invention, particularly illustrating the hull and open deck structure of the airship along with the mainsail arrangement.
Figure 2:
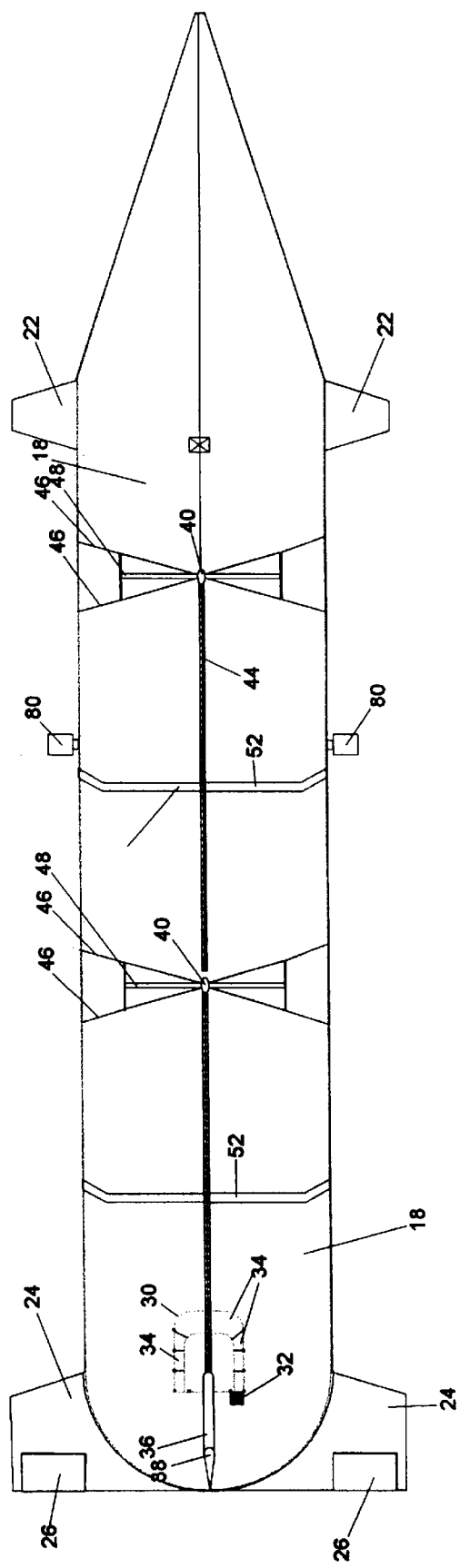
FIG. 2 is a top plan view of the airship of FIG. 1.
Figure 3:
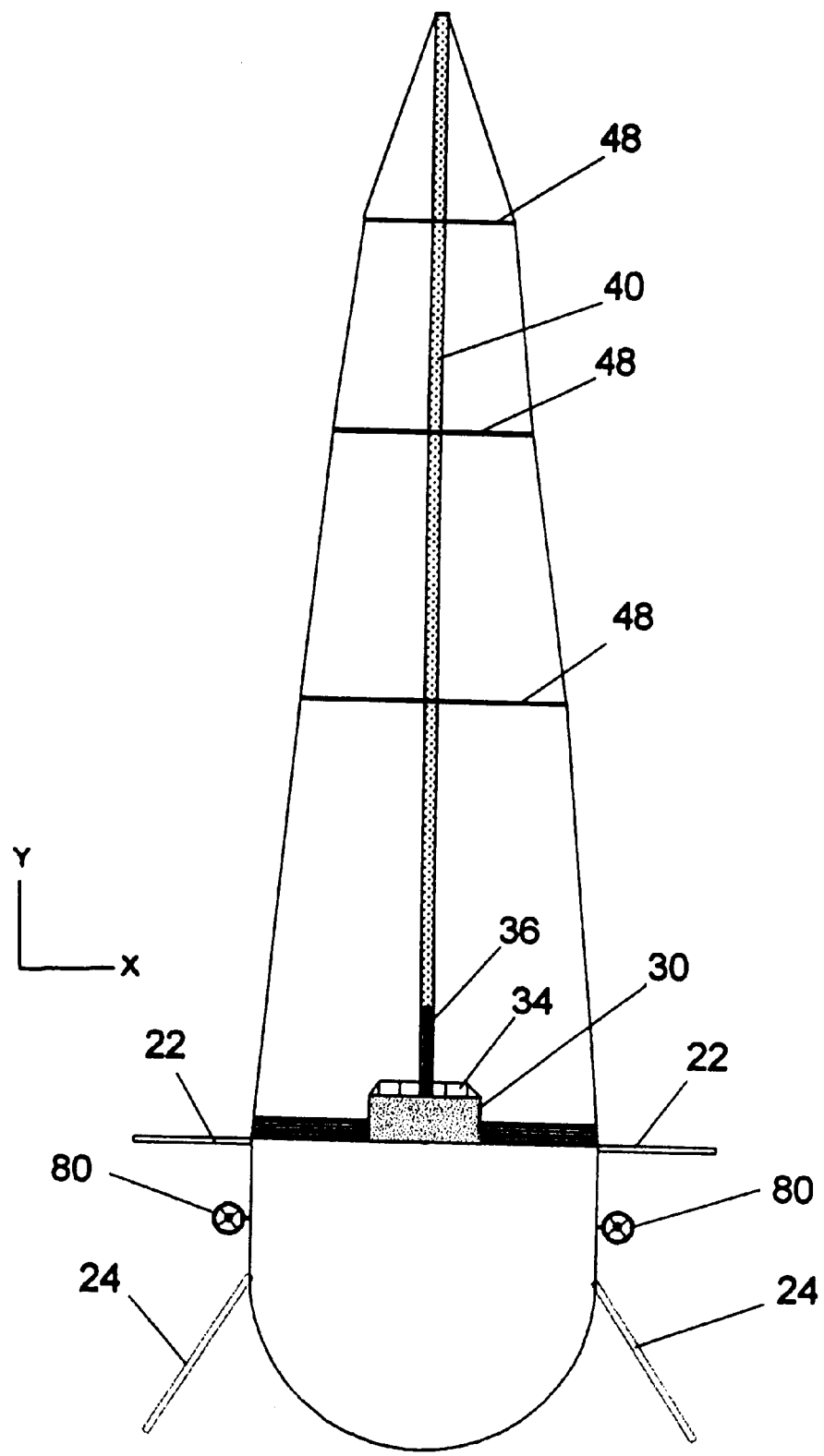
FIG. 3 is a rear view of the airship of FIG. 1.

Airship 2 is also provided with horizontal stabilizers 24 that include pivotal flaps 26 for controlling the ascent or descent of airship 2. Horizontal stabilizers 24 are so named because they control the horizontal attitude of airship 2 and not because they themselves are horizontal. In fact, each horizontal stabilizer 24 is inclined downwardly as shown in FIGS. 4 and 5 and extends outwardly from the rear of airship 2 as shown in FIGS. 1 and 2.

Pivotal flaps 26 are located along the trailing edges of horizontal stabilizers 24. Flaps 26 can be pivoted upwardly or downwardly by suitable controls accessible to the pilot of airship 2. When pivoted up, flaps 26 will force the nose of airship 2 down to initiate a descent. Conversely, when pivoted down, flaps 26 will force the nose of airship 2 up to initiate a climb.

Deck 18 of airship 2 includes an enclosed passenger and crew compartment or cockpit 30 that is accessible from deck 18 by a flight of stairs 32. Cockpit 30 includes a set of windows 34 for letting the passengers or crew see outside of cockpit 30. The passengers and crew will be seated in seats (not shown) provided in cockpit 30. Cockpit 30 may be multi-storied if desired, providing sleeping and galley accommodations in lower floors of cockpit 30. Cockpit 30 is located amidships on the rear of deck 18 near the stern of airship 2. In this location cockpit 30 is similar to the location of a cockpit in a sailboat.

A vertical stabilizer 36 extends upwardly from deck 18 of airship 2 to the rear of cockpit 30. Vertical stabilizer 36 includes a pivotal rudder 38, which in conjunction with opposite motion of flaps 26, can initiate lateral turns of airship 2. Again, movement of rudder 38 is controlled from cockpit 30 by any suitable control system.

Airship 2 is provided with at least one, and preferably two, masts 40 carrying sails 42 for primary or supplementary propulsion. As shown in FIGS. 4 and 5, each mast 40 extends vertically upwardly from deck 18 and includes a trailing boom 44 extending to the rear from mast 40. Each boom 44 is pivotal around mast 40 in the sense that boom 44 can swing or pivot around its point of attachment to mast 40.

Spar lines 46 extend from the top of each mast 40 down to deck 18 to help support mast 40 in a manner known in sailing ships. Various spars 48 extend out from each mast 40 to spar lines 46. The bottom of each spar line 46 is connected to a winch 50 located slightly below deck 18 in one of transverse frames 6. In addition, back stay lines 52 may be connected to at least the rear mast 40 to further help support the rear mast 40.

A sail 42 made of any conventional fabric sail material may be furled and unfurled and is carried on each mast 40. The front edge of sail 42 travels up and down mast 40 with the bottom edge of sail 42 supported along boom 44. Any suitable mechanism can be used for raising and lowering sail 42. For example, a remotely controlled winch (not shown) could be attached to a line attached to the top of sail 42 for raising and lowering sail 42. In any event, when sail 42 is completely unfurled and raised, it will have the configuration shown in FIG. 1, which is typical of a sail used on a sailing ship.

A boom winch 52 is provided for each mast 40 to control the position of boom 44 relative to mast 40. For example, winch 52 may be operated to let boom 44 swing out further from mast 40, when required, to better catch the wind, or to pull boom 44 more tightly in towards the longitudinal centerline of airship 2. Again, the operation of boom 44 relative to mast 40 is much like that of the corresponding component in a sailboat.

When the prevailing wind is coming from abeam, sails 42 can be winched in close to the centerline of airship 2 for maximum effectiveness. In addition, airship 2 is provided with a triangular center keel 60 that can be deployed to provide additional sail area and that adds stability. Keel 60 when unfurled comprises a triangular area of flexible sail material carrying a counterweight 62 at its lower end. Front and rear winches 64 and 66 can be used to furl keel 60 into a storage receptacle 68 when keel 60 is not used. Compare FIGS. 6 and 7 which show keel 60 in its stowed, furled, and retracted position and in its operational, unfurled deployed position, respectively.

The use of two front and rear sails 42 will obviously provide propulsive force to airship 2 from the prevailing winds. When the winds are from abaft, i.e. from the rear of airship 2, such that airship 2 is running with the wind, the respective booms 44 of masts 40 can be winched to opposite sides of airship 2 to fully expose the sail areas of the two sails 42 to the wind.

Figure 8:
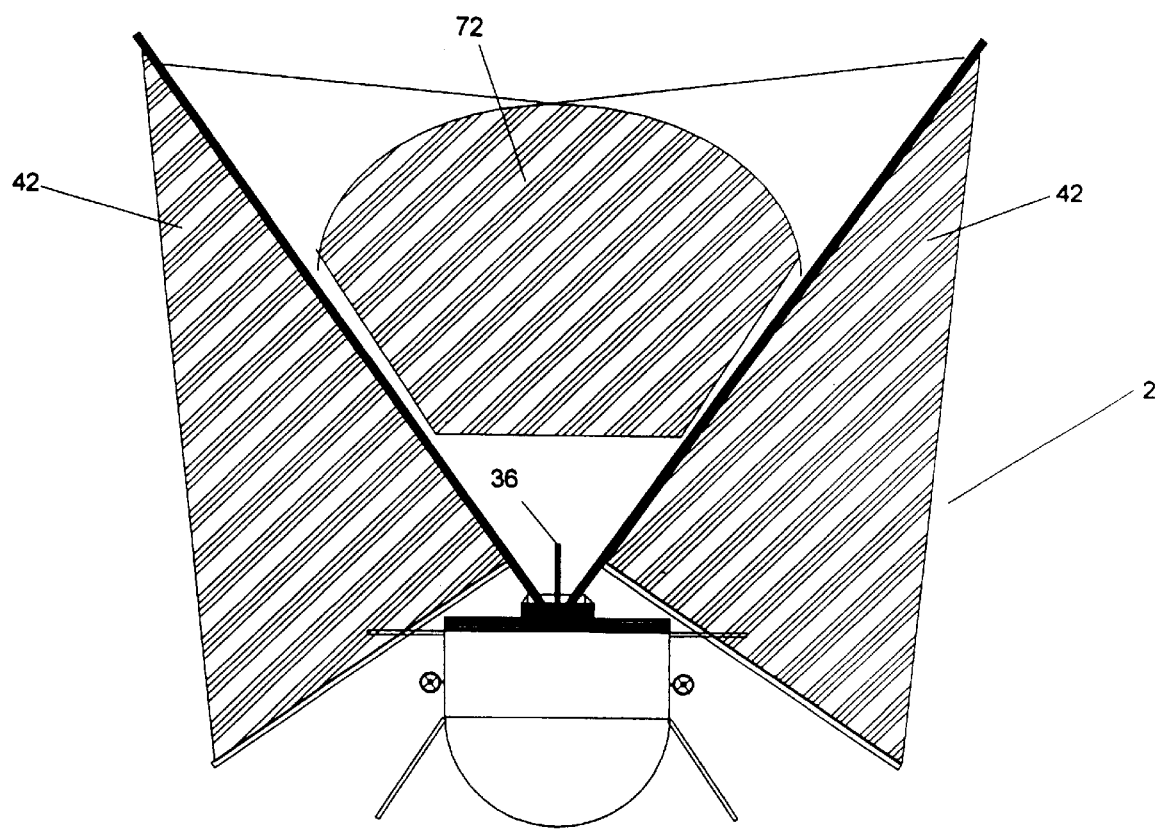
FIG. 8 is a rear view of the airship of FIG. 1 showing the two main masts tilted oppositely in a y-z plane relative to one another to expose a spinnaker or jib when running downwind.

In addition, masts 40 can be pivotally mounted on deck 18 of airship 2 so as to laterally pivot to the side in a y-z transverse plane where x is a longitudinal axis parallel to the centerline of airship 2, y is a vertical axis and z is a transverse axis. Thus, when running with the wind, the two masts 40 can be pivoted to open up a gap 70 therebetween. This allows a front spinnaker of jib 72 to be set and to be fully exposed to the wind. See FIG. 8. Thus, maximum use of the wind when running with the wind is permitted by this sail configuration and use of pivotal masts 40.

Masts 40 are pivotally supported on deck 18 and pivoted to one side by any suitable mechanism. As shown in FIGS. 4 and 5, each mast 40 includes a ballast tank 74 below deck 18 containing water or some other suitable ballast material. Left and right hydraulic actuators 76 are provided for pivoting mast 40 to one side or the other. FIG. 4 shows mast 40 in an upright orientation with the actuators 76 being extended or retracted similar amounts. FIG. 5 shows one actuator 76 having been further extended and one actuator 76 having been further retracted to pivot mast 40 to one side. Spar line winches 50 will also be operated to take up any resulting slack in spar lines 46 so that they continue to be tensioned to support mast 40. The operation of actuators 76 and spar line winches 50 are controlled by suitable controls carried inside cockpit 30 and accessible to the crew.

In many cases, the winds available to airship 2 during flight will be sufficient to propel airship 2 at a desirable speed. However, should the winds be light or non-existent, some other mechanical form of propulsion would be required. Therefore, small turbofan engines 80 are carried on each side of airship 2 to provide propulsion in this event.

The use of sails 42 as described herein will often advantageously propel airship 2 without using engines 80 to the degree that would otherwise be necessary. Thus, the amount of fuel airship 2 must carry is lessened and the costs of operating airship 2 are decreased. In addition, because masts 40 are carried on framework structure provided above lifting bladders 16, the sail size may be increased so as to be more effective. Yet, the sails 42 are still located close to cockpit 30 and are accessible, if need be, from deck 18. Accordingly, their operation can be observed and controlled much like that in a sailboat.

The mounting of masts 40 for a pivoting motion in a transverse y-z plane further increases the downwind running speed of airship 2. When the wind is coming from behind airship 2, pivoting masts 40 to opposite sides allows the spinnaker and/or jib 72 set at the front of airship 2 to be fully exposed to the wind. Accordingly, the effective sail area is dramatically increased.

The provision of a flat deck on airship 2 adjacent cockpit 30 also has advantages. In many conditions, it would be possible for passengers and/or crew to walk around deck 18. This gives airship 2 the feeling of a sailing ship designed for water and allows a different and more open experience than simply being continuously confined within cockpit 30. Accordingly, the pleasure derived by the passengers and crew from traveling on airship 2 of this invention should be significantly enhanced due to the use of deck 18.

Various modifications of this invention will be apparent to those skilled in the art. Accordingly, this invention is to be limited only by the appended claims.

I claim:

1. An airship, which comprises:
   (a) a rigid framework;
   (b) means attached to the framework for containing a lighter than air substance to thereby lift the framework; and
   (c) a substantially flat deck carried on the framework above the containing means, at least one mast extending upwardly from the deck, wherein the mast carries a wind-catching sail thereon for helping to propel the framework, wherein the framework has a longitudinal x axis, a vertical y axis, and a transverse z axis, and wherein the mast is pivotally carried on the framework to transversely pivot on the framework in the plane defined by the y and z axes.

2. The airship of claim 1, wherein the framework is elongated and the containing means comprises a plurality of bladders arranged end to end on the framework.

3. The airship of claim 2, wherein the deck is sized to cover substantially the entire framework and to overlie the plurality of bladders carried on the framework.

4. The airship of claim 1, further including a second mast extending upwardly from the deck, and wherein the second mast carries a wind-catching sail thereon for helping to propel the framework, and wherein the second mast is also pivotally carried on the framework to transversely pivot on the framework in the plane defined by the y and z axes, whereby the two masts may be pivoted to opposite sides of the framework in the y-z plane to open up a gap therebetween.

5. The airship of claim 4, further including a spinnaker or jib sail that may be attached to the deck forwardly of the two masts to be exposed to wind coming from behind the framework through the gap opened between the two masts when the masts are pivoted to the sides of the framework.

6. The airship of claim 1, wherein the mast includes at least one spar line extending downwardly from the top of the mast to each side of the framework to help support the mast, and further including means for winching in or letting out the spar lines as required to accommodate pivoting motion of the mast.

7. The airship of claim 1, further including means for pivoting the mast to one side or the other.

8. The airship of claim 7, wherein the pivoting means includes at least one hydraulic actuator connected to the mast.

9. The airship of claim 1, wherein the lower end of the mast extends beneath the deck of the framework and includes a ballast on the end thereof.

10. The airship of claim 1, wherein the mast carries a pivotal boom adjacent the deck which boom attaches to the lower edge of the sail.

11. The airship of claim 1, further including a crew carrying compartment on the deck.

12. An airship, which comprises:
    (a) a rigid framework;
    (b) means attached to the framework for containing a lighter than air substance to thereby lift the framework;
    (c) a substantially flat deck carried on the framework above the containing means, further including at least one mast extending upwardly from the deck, and wherein the mast carries a wind catching sail thereon for helping to propel the framework, further including a crew carrying compartment on the deck to the rear of the at least one mast.

13. An airship, which comprises:
    (a) a rigid framework;
    (b) means attached to the framework for containing a lighter than air substance to thereby lift the framework; and
    (c) a substantially flat deck carried on the framework above the containing means, further including front and rear canard wings attached to the framework adjacent a front of the framework, downwardly inclined horizontal stabilizers attached to the rear of the framework, and a vertical stabilizer attached to the deck adjacent a rear portion of the deck, the horizontal stabilizers having pivotal flaps and the vertical stabilizer having a pivotal rudder.

14. The airship of claim 1, wherein the framework is shaped to provide a configuration that is similar to a sailing ship with such configuration providing an inclined bow, a vertical stern, a rounded bottom, and vertical sides all topped by the deck.

15. An airship, which comprises:
   (a) a rigid framework, wherein the framework has a longitudinal x axis, a vertical y axis, and a transverse z axis;
   (b) means attached to the framework for containing a lighter than air substance to thereby lift the framework; and
   (c) at least one vertically extending mast carried on the framework for carrying a wind catching sail that may be unfurled for catching wind, wherein the mast is pivotally carried on the framework to transversely pivot on the framework in the plane defined by the y and z axes.

16. The airship of claim 15, further including a second mast carried on the framework, and wherein the second mast carries a wind-catching sail thereon for helping to propel the framework, and wherein the second mast is also pivotally carried on the framework to transversely pivot on the framework in the plane defined by the y and z axes, whereby the two masts may be pivoted to opposite sides of the framework in the y-z plane to open up a gap therebetween.

17. The airship of claim 15, further including a retractable bottom keel on the bottom of the framework which may be extended when the sail is deployed to help performance when the wind is abeam the framework.

18. The airship of claim 17, wherein the keel is made of a flexible sail material which may be rolled and unrolled to retract and deploy the keel.

19. An airship, which comprises:
   (a) a relatively rigid framework having an inclined bow, a rounded bottom, a vertical stern, vertical sides and a substantially flat upper deck;
   (b) a plurality of lifting bladders for carrying a lighter than air substance with such bladders being enclosed within the framework beneath the upper deck to lift the framework;
   (c) front and rear masts extending upwardly from the deck which masts carry front and rear sails, respectively, on pivotal booms;
   (d) a passenger and crew compartment located on the deck behind the front and rear masts;
   (e) wherein the masts are pivotally supported on the framework to pivot laterally to one side and the other to open up a lateral gap therebetween if so desired; and
   (f) a spinnaker or jib which can be set forwardly of the masts in the gap to be fully exposed to wind from abaft the framework.

* * * * *